United States Patent [19]

Nakao et al.

[11] Patent Number: 4,962,846
[45] Date of Patent: Oct. 16, 1990

[54] UNLOADER

[75] Inventors: Takeyoshi Nakao; Yoshio Kada, both of Niihama, Japan

[73] Assignee: Sumitomo Heavy Industries. Ltd., Tokyo, Japan

[21] Appl. No.: 382,074

[22] Filed: Jul. 17, 1989

Related U.S. Application Data

[63] Continuation of Ser. No. 151,661, Feb. 2, 1988, abandoned.

[30] Foreign Application Priority Data

Mar. 26, 1987 [JP] Japan .................................. 62-44631
Mar. 26, 1987 [JP] Japan .................................. 62-44632

[51] Int. Cl.$^5$ ............................................. B65G 67/60
[52] U.S. Cl. ................................... 198/602; 198/560;
414/140.7; 414/140.9; 414/141.8
[58] Field of Search ............... 198/369, 518, 560, 570,
198/602; 414/140.7, 140.8, 140.9, 141.8

[56] References Cited

U.S. PATENT DOCUMENTS

| | | | |
|---|---|---|---|
| 3,559,894 | 2/1971 | Murray | 239/672 |
| 4,051,948 | 10/1977 | Sackett, Sr. | 414/398 x |
| 4,152,029 | 5/1979 | Cowpertwait | 414/145 X |
| 4,334,818 | 6/1982 | Tingskog | 414/139 |
| 4,702,367 | 10/1987 | Svensson | 198/518 X |

FOREIGN PATENT DOCUMENTS 1202223 9/1965 Fed. Rep. of Germany ...... 198/369

*Primary Examiner*—Robert J. Spar
*Assistant Examiner*—Janice Krizek
*Attorney, Agent, or Firm*—Armstrong, Nikaido, Marmelstein, Kubovcik & Murray

[57] ABSTRACT

An unloader for unloading bulk commodities within holds, such as wheat and coal. A plurality of boom conveyers are juxtaposed on a boom, and vertical screw conveyers, each having at the lower end an inlet port for receiving a bulk commodity to be conveyed and at an upper portion a chute for discharging the bulk commodity into the corresponding boom conveyer, are used in unloading by exclusively combining the vertical screw conveyers with the corresponding boom conveyers. In this way, the unloader is provided with a plurality of conveyance routes so as to be applicable to unloading of a plurality of different kinds of bulk commodities. Because one conveyance route can be exclusively used in unloading in accordance with the kind of bulk commodity to be unloaded, there is no need to clean the vertical screw conveyer and boom conveyer each time the kind of bulk commodity to be unloaded changes.

2 Claims, 8 Drawing Sheets

UNLOADER

This application is a continuation of application Ser. No. 151,661 filed Feb. 2, 1988, now abandoned.

BACKGROUND OF THE INVENTION

1. Field of the Invention

The present invention relates to an unloader with vertical screw conveyers which is capable of providing a plurality of conveyance routes for unloading a plurality of different kinds of bulk commodities, such as coal and wheat.

2. Description of the Prior Art

A conventional unloader with a vertical screw conveyer is shown in FIG. 12. As shown in FIG. 12, in such a conventional unloader, a boom 1' has a single boom conveyer 11', and a single vertical screw conveyer 4' having a chute facing the conveyer 11' is hung from the head of the boom 1' Accordingly, this unloader provides only one conveyance route formed by the screw conveyer 14', the chute, the boom conveyer 11', another chute 20' and a conveyer 21' on the ground. In consequence, if a single unloader of this type is used to unload a plurality of different kinds of bulk commodities, each time the kind of bulk commodity to be unloaded changes, the entire conveyance route has to be cleaned with water or by another suitable method, in order to remove any of the previously unloaded bulk commodity which might otherwise remain along the conveyance route and mix with the subsequent bulk commodity. Because such cleaning takes a long time, a quick changeover in the kind of bulk commodity being unloaded is hindered, thus lowering the efficiency of unloading.

SUMMARY OF THE INVENTION

The present invention has been accomplished to eliminate the above-stated disadvantage of the prior art, and an object of the present invention is to provide an unloader which is capable of unloading a plurality of different kinds of bulk commodities with an increased level of efficiency.

To this end, according to the present invention, there is provided an unloader comprising: a boom having juxtaposed thereon at least two boom conveyers; vertical screw conveyers each having at the lower end an inlet port for receiving a bulk commodity to be conveyed and at an upper end portion a chute for discharging the bulk commodity into the corresponding boom conveyer, the vertical screw conveyers each being adapted to be exclusively combined with the corresponding boom conveyer; and means for hanging at least one of the vertical screw conveyers from the head of the boom in such a manner as to allow swinging of the vertical screw conveyer.

According to one aspect of the present invention, the unloader has such a construction that one of the vertical screw conveyers can be disengageably mounted on the head of the boom at a location between the juxtaposed boom conveyers. Therefore, vertical screw conveyers which are exclusively for use in unloading can be easily exchanged with one another in accordance with the kind of bulk commodity to be unloaded.

According to another aspect of the present invention, the unloader has such a construction that all the vertical screw conveyers which are exclusively combined with the corresponding boom conveyers are hung from the head of the boom in such a manner as to be able to swing individually, and the unloader is provided with means for causing each of the vertical screw conveyers to swing to a horizontal position and for holding it at the horizontal position. With this aspect of the present invention, all vertical screw conveyers which are not in use are kept at their horizontal positions, except the one vertical screw conveyer that is exclusively used in unloading the bulk commodity to be unloaded.

According to the present invention, the unloader is provided with a plurality of sets of vertical screw conveyers and boom conveyers so as to constitute a plurality of conveyance routes in accordance with a plurality of different kinds of bulk commodities, in such a manner that one set consisting of a screw conveyer and a boom conveyer corresponds to one kind of bulk commodity. This arrangement eliminates the need for cleaning the entire conveyance route each time the kind of bulk commodity to be unloaded changes.

The above and other objects, constructions, and advantages of the present invention will become more apparent when the following description of embodiments is read with reference to the accompanying drawings.

DESCRIPTION OF THE PREFERRED EMBODIMENTS

Figure 1:
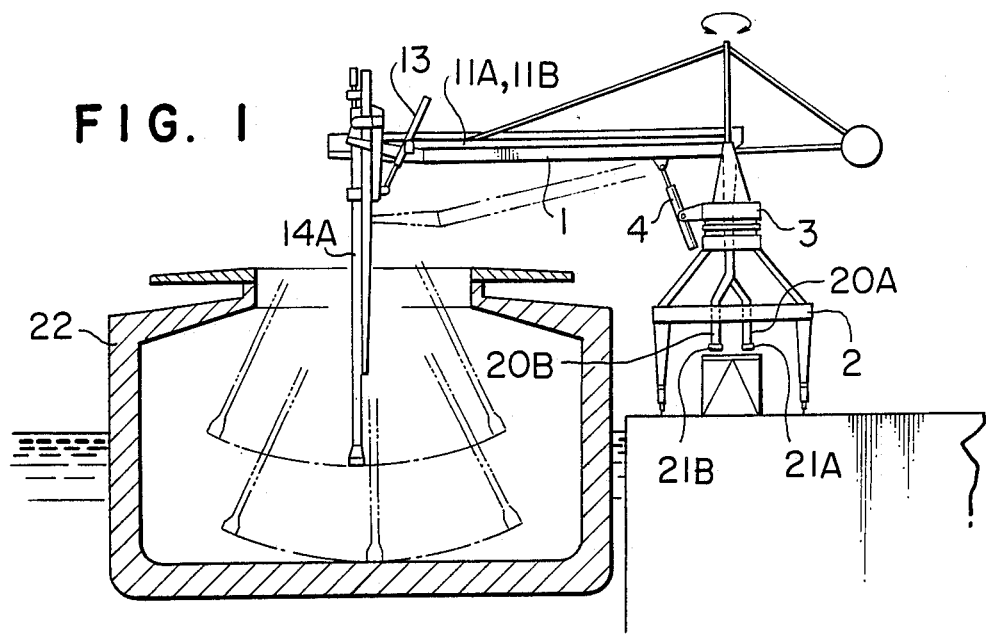
FIG. 1 is a side view schematically illustrating one embodiment of the present invention.
Figure 2:
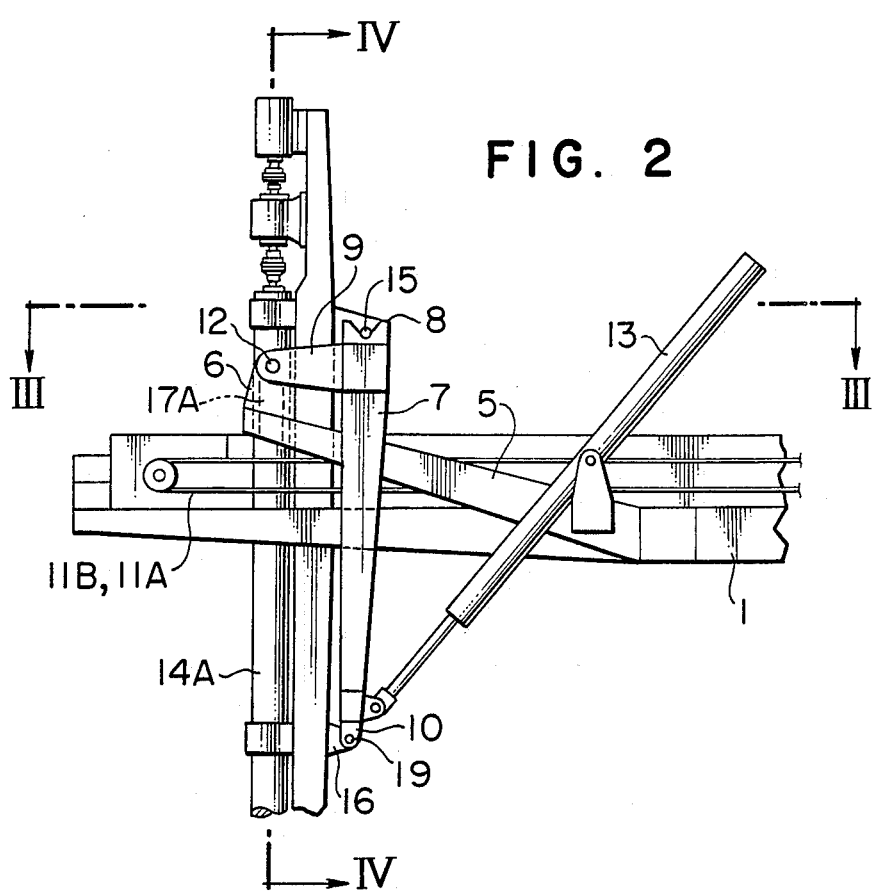
FIG. 2 is an enlarged side view of essential parts shown in FIG. 1.

One embodiment of the present invention will be described hereunder with reference to FIGS. 1 to 7.

In these figures, reference numeral 1 denotes a boom which is pivotally mounted on a rotary frame 3 disposed above a movable table 2 and which can be hoisted by a hoisting device 4. Supporting arms 5 are each provided on either side of the head of the boom 1 in such a manner as to extend away from the rotary frame 3. A bracket 6 is provided on the tip portion of each supporting arm 5.

Reference numeral 7 denotes a rectangular shaped mounting frame. The mounting frame 7 has an upper frame member, and pin receiving portions 8 which open upward are provided at central locations of the upper frame member. Further, a pair of mounting links 9 which extend forward are provided at either end of the upper frame member. A pin linking portion 10 is provided at a central location of a lower frame member of the mounting frame 7.

At least the boom 1 and boom conveyers 11A and 11B (described later) which are provided on the boom 1 are inserted into the opening defined by the mounting frame 7. Further, the tip portions of the mounting links 9 are rotatably mounted on the corresponding brackets 6 through pins 12. In addition, a swinging cylinder 13 is rotatably mounted on the base portion of each supporting arm 5, and each of the cylinders 13 has a rod which is linked at the tip portion thereof to the corresponding end portion of the lower frame of the mounting frame 7. With this arrangement, the mounting frame 7 is hung from the head of the boom 1 and is swingable about the pins 12 by the swinging cylinders 13 through an angle above a predetermined value without interfering with the boom 1 and the boom conveyers 11A and 11B.

Reference numeral 14A denotes a vertical screw conveyer for unloading, for instance, wheat, while reference numeral 14B denotes a vertical screw conveyer for unloading, for instance, coal. These vertical screw conveyers 14A and 14B have basically the same construction. A conveyer frame of each vertical screw conveyer 14A or 14B has on an upper portion a hanging pin 15 and a pin linking portion 16 which are separated from each other in the substantially vertical direction. A chute 17A or 17B is pivotally connected to one side of the corresponding conveyer 14A or 14B, the one side of one conveyer being opposite to that of the other, at a location concentrical with the pins 12. Each of these chutes 17A and 17B is fixed to the boom 1 by means of bolts and the like after the corresponding screw conveyer 14A or 14B has been mounted on the mounting frame 7 which is, in turn, hung from the head of the boom 1.

When one of the vertical screw conveyers 14A and 14B (i.e., the conveyer 14A in FIGS. 3 to 5, whereas the conveyer 14B in FIG. 6) is mounted on the mounting frame 7, that conveyer 14A or 14B is supported by the frame 7 in such a manner as to be swingable about the pins 12 within an elongated hole 18 formed in the head of the boom 1 between the boom conveyers 11A and 11B. Also at this time, the hanging pin 15 is received in the pin receiving portions 8 to engage therewith, while the pin linking portions 10 and 16 are linked by a fixing pin 19.

The boom conveyers 11A and 11B are juxtaposed on the boom 1 in such a manner that the chute 17A or 17B of the corresponding screw conveyer 14A or 14B faces the inlet side of the boom conveyer 11A or 11B.

Reference numerals 20A and 20B denote chutes which extend through the rotary frame 3 and the movable table 2. These chutes 20A and 20B are disposed in such a manner as to face the discharge ends of the boom conveyers 11A and 11B, respectively.

Reference numerals 21A and 21B denote conveyers on the ground. These conveyers 21A and 21B are juxtaposed along the line on which the movable table 2 runs. The conveyers 21A and 21B are disposed in such a manner as to face the chutes 20A and 20B, respectively.

Although the above description of this embodiment concerned an arrangement in which one vertical screw conveyer 14A or 14B is disengageably hung on the head of the boom 1, and in which, in correspondence with this, two boom conveyers 11A and 11B as well as two chutes 20A and 20B and two conveyers 21A and 21B on the ground are provided, so as to provide two routes for conveying wheat and coal within the unloader, such an arrangement is a mere example, and it should be understood that the number of conveyance routes is not limited to two.

Figure 3:
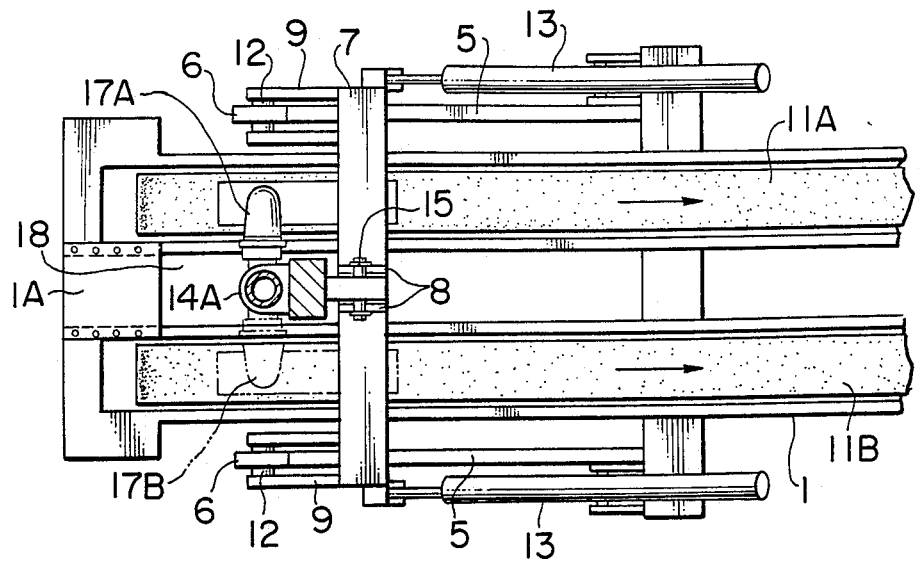
FIG. 3 is a plan view taken along the line III—III shown in FIG. 2.
Figure 4:
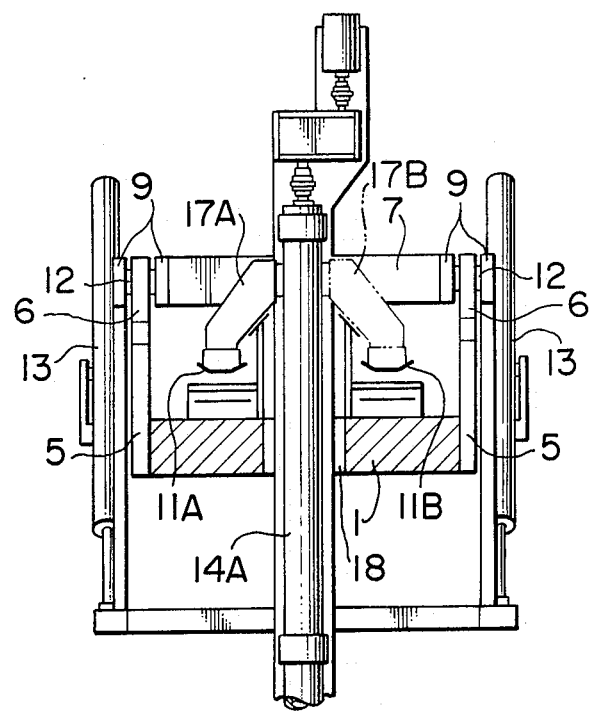
FIG. 4 is a partially sectioned front view taken along the line IV—IV shown in FIG. 2.
Figure 5:
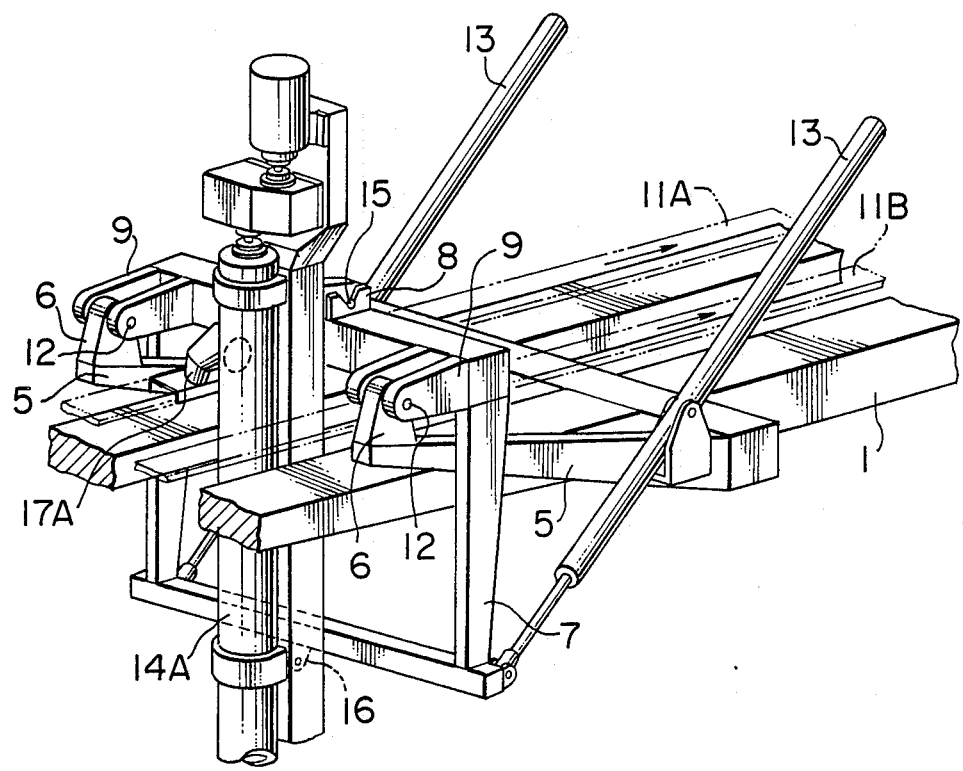
FIGS. 5 and 6 are fragmentary perspective views showing the conditions in which a vertical screw conveyer for unloading wheat and a vertical screw conveyer for unloading coal are respectively mounted on the head of a boom.
Figure 6:
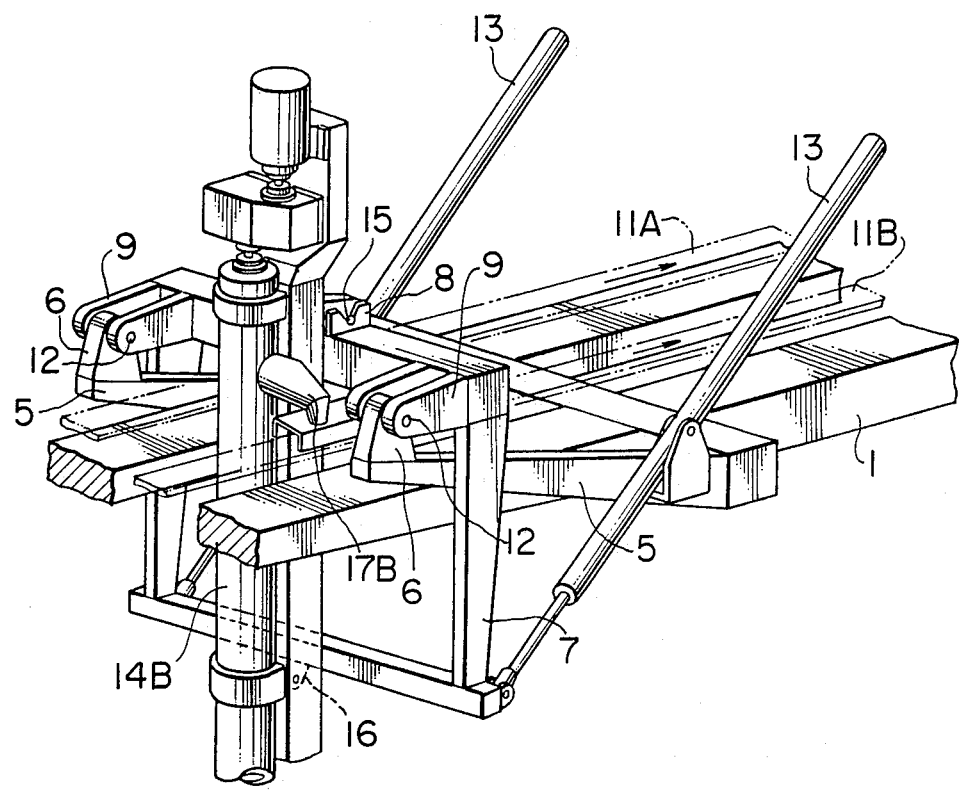
Figure 7:
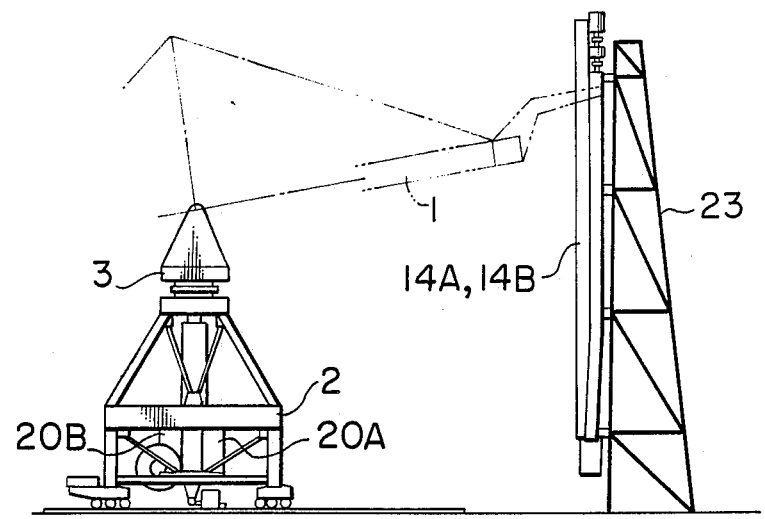
FIG. 7 is a side view showing the condition in which the vertical screw conveyers are being exchanged.
Figure 8:
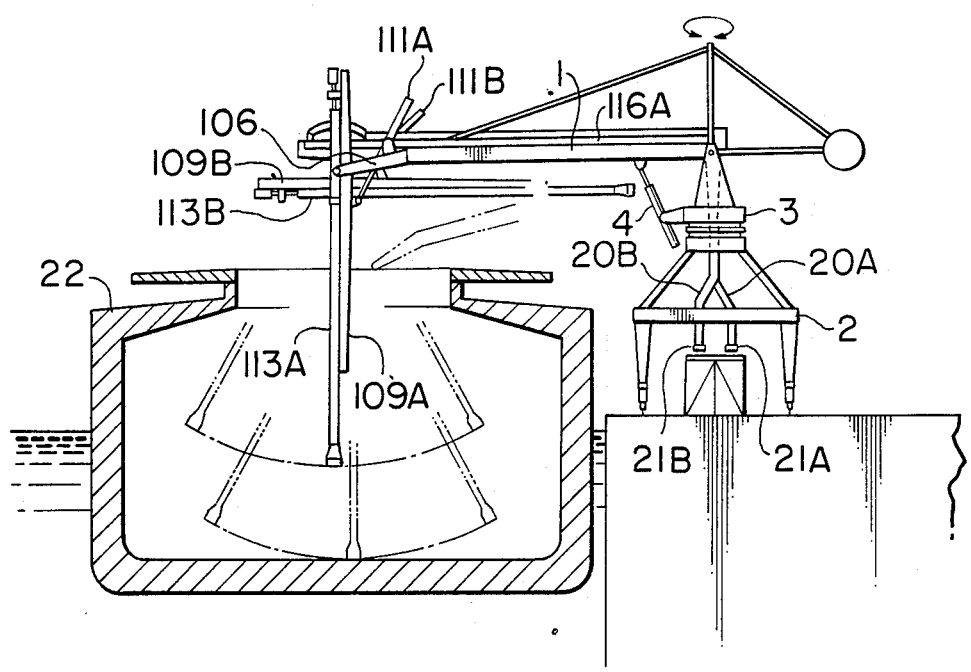
FIG. 8 is a side view schematically illustrating another embodiment of the present invention.
Figure 9:
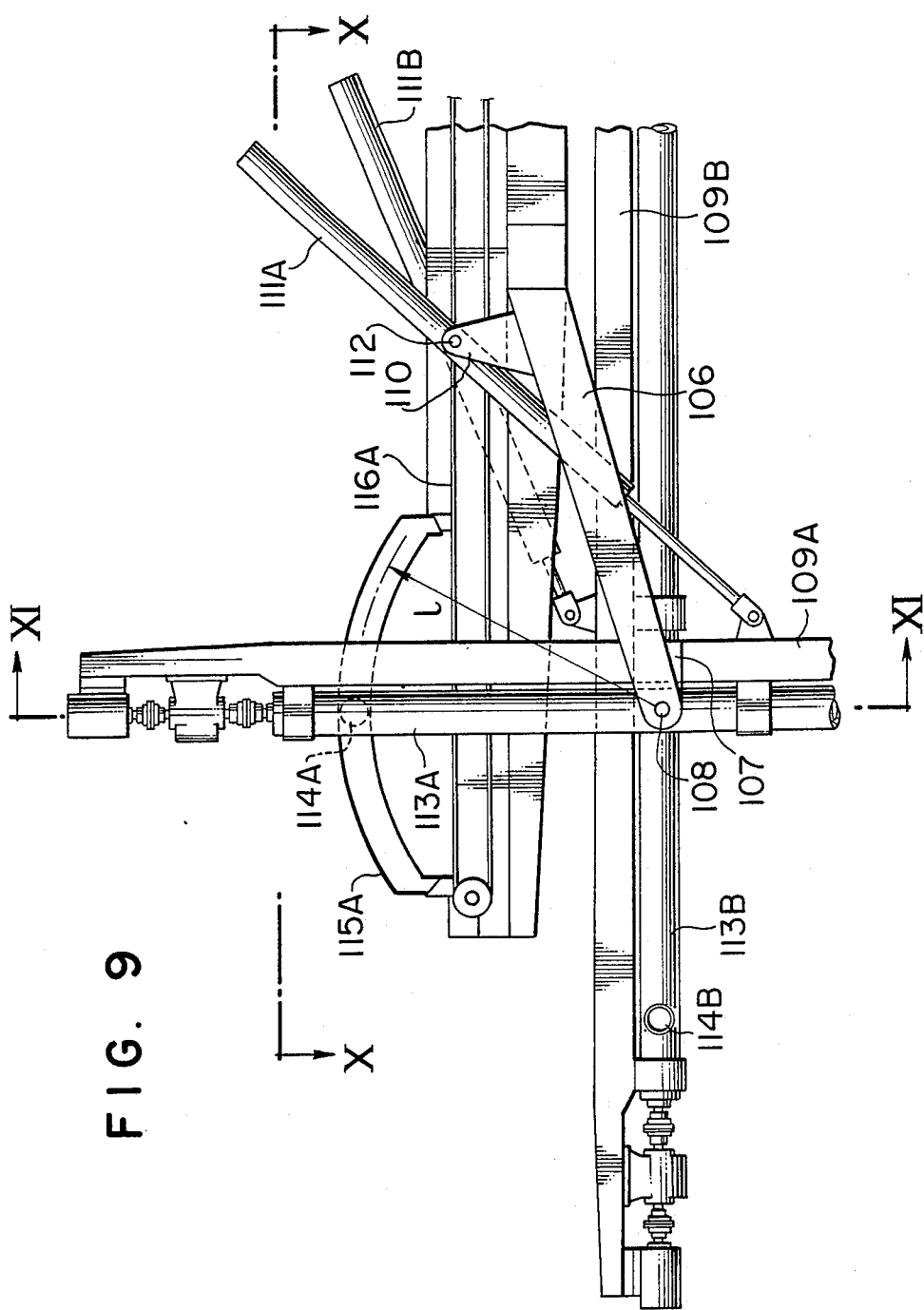
FIG. 9 is an enlarged side view of essential parts shown in FIG. 8.
Figure 10:
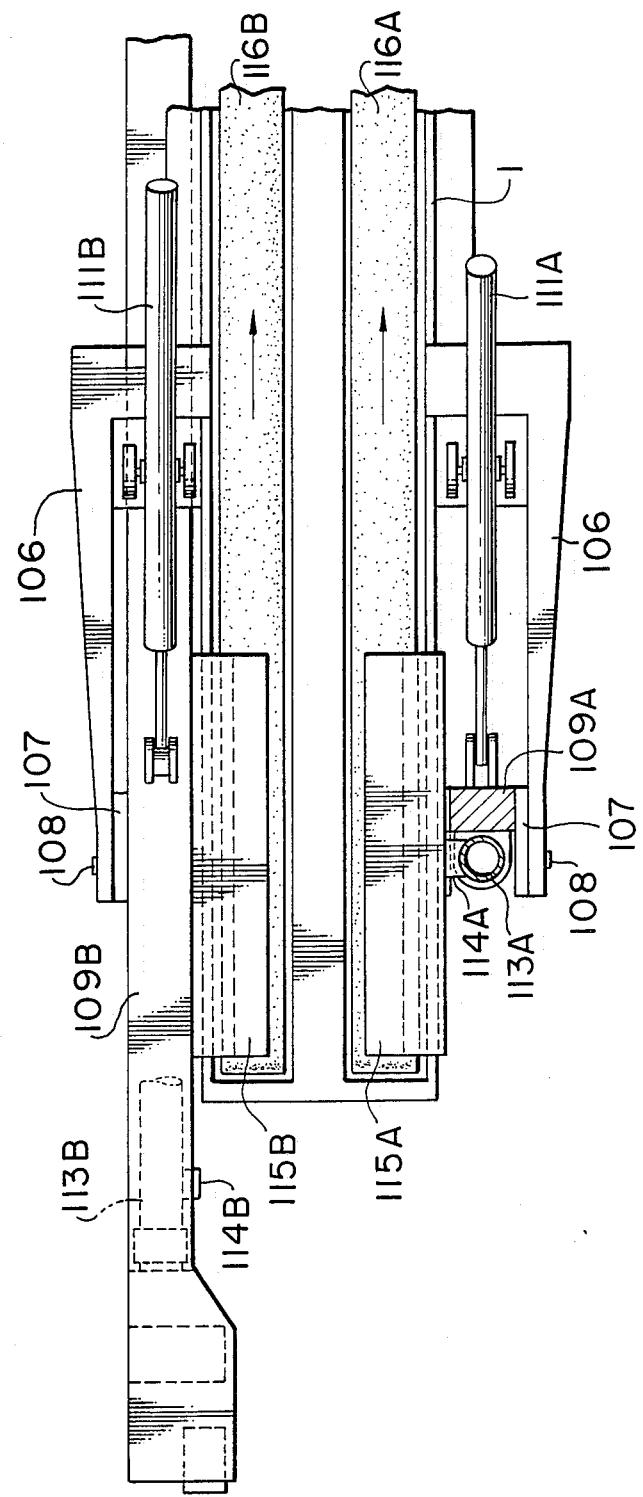
FIG. 10 is a plan view taken along the line X—X shown in FIG. 9.
Figure 11:
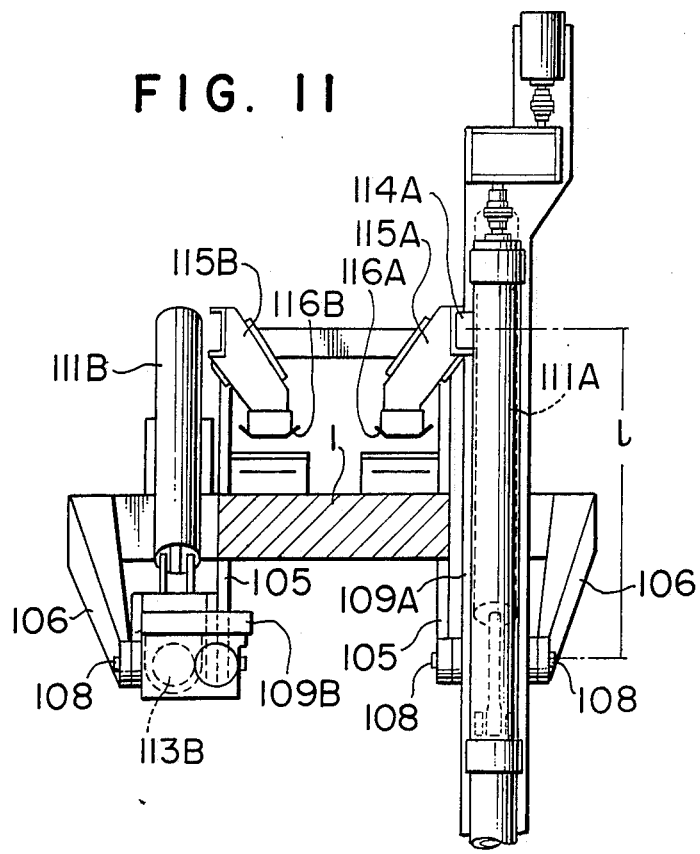
FIG. 11 is a partially sectioned front view taken along the line XI—XI shown in FIG. 9.
Figure 12:
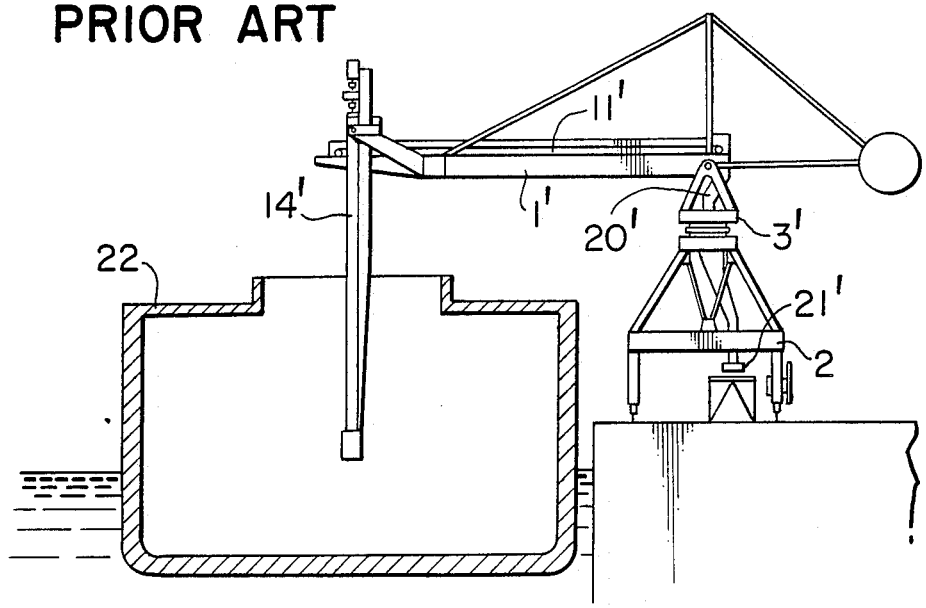
FIG. 12 is a side view schematically illustrating a conventional unloader.

If the arrangement of the head of the boom 1 is such that, as shown in FIG. 3, a joining plate 1A can be removed when the vertical screw conveyer is to be exchanged with another, this arrangement facilitates bringing the head of the boom 1 into alignment with any of the body portions of screw conveyers which are stored in a stand 23 in the vertical state, as shown in FIG. 7.

When it is necessary to unload, for instance, wheat from a hold of a ship 22, the unloader is first driven to a location where screw conveyers are stored. The vertical screw conveyer 14A for unloading wheat, which has been stored in the storing stand 23 in the vertical state, is mounted on the mounting frame 7 by bringing the pin 15 of the conveyer 14A into engagement with the pin receiving portions 8 of the upper frame member of the mounting frame 7 and by linking the pin linking portions 16 and 10 by the fixing pin 19. The thus mounted vertical screw conveyer 14A for unloading wheat is hung from the head of the boom 1 through the mounting frame 7 and is in a state of being swingable by the action of the swinging cylinders 13. Therefore, when the vertical screw conveyer 14A for unloading wheat is placed in the hold and an unloading operation is started, wheat within the hold is conveyed by the vertical screw conveyer 14A and is discharged into the corresponding boom conveyer 11A through the corresponding chute 17A, and, the wheat is continuously conveyed to a location such as a wheat storage tank by the boom conveyer 11A as well as the corresponding chute 20A and conveyer 21A on the ground.

Thereafter, when it is necessary to unload, for instance, coal from a different hold, the vertical screw conveyer 14A for unloading wheat is returned to the storing stand 23 by performing the above-mentioned processes in the reverse order, and, in place of the conveyer 14A, the vertical screw conveyer 14B for unloading coal is mounted on the mounting frame 7 hung from the head of the boom 1 in a manner similar to that described above. Thereafter, an unloading operation is performed, so that coal within the hold is conveyed by the vertical screw conveyer 14B for unloading coal, is discharged into the corresponding boom conveyer 11B through the corresponding chute 17B, and is continuously conveyed to a location such as a coal yard by the boom conveyer 11B as well as the corresponding chute 20B and conveyer 21B on the ground.

Another embodiment of the present invention will be described hereunder with reference to FIGS. 8 to 11.

A boom 1 is pivotally mounted on the rotary frame 3 on the movable table 2 and can be hoisted by a hoisting device 4. The head of the boom 1 is provided on either side thereof with a pair of supporting arms 105 and 106. The pairs of supporting arms 105 and 106 oppose to each other widthwise of the boom 1 and they each have a pin bearing portion at a location below the boom 1. Each pin bearing portion is located at the tip portion of the corresponding pair of the supporting arms 105 and 106, and a mounting frame 109A or 109B is swingably mounted in the corresponding pin bearing portion through a bracket 107 by means of a pin 108. Each of the supporting arms 106 projects from a side portion of the boom 1 and inclines downward as it extends away from the rotary frame 3. A cylinder mounting portion 110 is provided on the base portion of each supporting arm 106.

Reference numerals 111A and 111B denote swinging cylinders which are each mounted on the corresponding cylinder mounting portion 110 on the side of the boom 1 through a pin 112 and is thus trunnion supported in a rotatable manner. Each of the cylinders 111A and 111B has a rod the tip of which is connected to the corresponding mounting frame 109A or 109B. With this arrangement, the mounting frames 109A and 109B can be swung individually about the pins 108 by means of the swinging cylinders 111A and 111B, respectively.

Reference numeral 113A denotes a vertical screw conveyer for unloading, for instance, wheat, while reference numeral 113B denotes a vertical screw conveyer for unloading, for instance, coal. These conveyers 113A and 113B have the same construction, and they are each mounted on the corresponding mounting frame 109A or 109B. Therefore, the screw conveyers 113A and 113B can swing about the pins 108 individually.

The vertical screw conveyer 113A for unloading wheat and the vertical screw conveyer 113B for unloading coal have discharge ports 114A and 114B which are formed on opposite sides of these conveyers 113A and 113B. The head of the boom 1 is, in turn, provided with chutes 115A and 115B. The chutes 115A and 115B each has a chute port formed into a circular-arc shape of a radius equal to the length a from the center of swinging of the conveyer, i.e., from the pin 108, to the discharge port 114A or 114B of the conveyer, and they each have a lower end facing the inlet side of a corresponding boom conveyer 116A or 116B, described later. With this arrangement, when each of the vertical screw conveyers 113A and 113B is brought into a standing position, the discharge port 114A or 114B registers with the chute port of the chute 115A or 115B, and this registration is maintained during swinging of each conveyer. On the other hand, when each of the vertical screw conveyers 113A and 113B is brought down to a position flush with the boom 1, the discharge port 114A or 114B is released from its registration with the chute port 115A or 115B.

The boom conveyers 116A and 116B are juxtaposed on the boom 1.

Reference numerals 20A and 20B denote chutes provided on the movable table 2. These chutes 20A and 20B each have a chute port which faces the discharge end of the corresponding boom conveyer 116A or 116B.

Reference numerals 21A and 21B denote conveyers on the ground which are juxtaposed along the line on which the movable table 2 runs. The conveyers 21A and 21B are disposed in such a manner as to face the chutes 20A and 20B, respectively.

Although the above description of this embodiment concerned an arrangement in which two vertical screw conveyers 113A and 113B are hung on the head of the boom 1, and in which, in correspondence with this, two boom conveyers 116A and 116B as well as two chutes 20A and 20B and two conveyers 21A and 21B on the ground are provided, so as to provide two routes for conveying wheat and coal within the unloader, such an arrangement is a mere example, and it should be understood that the number of conveyance routes is not limited to two.

When it is necessary to unload, for instance, wheat from a hold of a ship 22, with a hydraulic operating fluid circuit of the swinging cylinder 111B being opened, the vertical screw conveyer 113B for unloading coal is rotated about the pin 108 by catching a lower end portion of the vertical screw conveyer 113B by means of a hook (not shown) attached to one end of a rope (not shown) and winding the rope on a winch (not shown), until the vertical screw conveyer 113B is brought into a position flush with the boom 1, and the conveyer 113B is kept at this position. Thereafter, the vertical screw conveyer 113A for unloading wheat is placed in the hold. When an unloading operation is started, wheat within the hold is conveyed by the vertical screw conveyer 113A and is discharged into the corresponding boom conveyer 116A through the discharge port 114A and the chute 115A, and, the wheat is continuously conveyed to a location such as a wheat storage tank by the boom conveyer 116A as well as the corresponding chute 20A and conveyer 21A on the ground. Illustration of the rope and a winch device which are used to bring the screw conveyer 113A or 113B into a position flush with the boom 1 and for keeping the conveyer at this position is omitted in the drawings.

Thereafter, when it is necessary to unload, for instance, coal from a different hold, after the vertical screw conveyer 113A for unloading wheat has been brought into and kept at a position below the boom 1 in a manner similar to that described above, the vertical screw conveyer 113B for unloading coal is placed in the hold, and an unloading operation is performed, so that coal within the hold is conveyed by the vertical screw conveyer 113B, is discharged into the corresponding boom conveyer 116B through the discharge port 114B and the chute 115B, and is continuously conveyed to a location such as a coal yard by the boom conveyer 116B as well as the corresponding chute 20B and conveyer 21B on the ground.

As described above, with the unloader in accordance with the present invention, a plurality of different kinds of bulk commodities can be conveyed through different conveyance routes, thereby preventing any parts of the different kinds of bulk commodities from mixing with each other. This feature of the present invention allows any of the previously unloaded bulk commodity to remain along the conveyance route. This, in turn, eliminates the need for cleaning the conveyance route for the purpose of preventing the bulk commodities from mixing, and also enables a quick changeover in the kind of bulk commodity being unloaded, simply by exchanging the vertical screw conveyer mounted on the head of the boom with another or by bringing the vertical screw conveyers that are not in use into positions flush with the boom and keeping them at their positions and bringing the vertical screw conveyer that is to be used into a standing position. Therefore, an unloading operation can be performed without requiring a long time, thereby attaining a great increase in the efficiency.

What is claimed is:

1. An unloader comprising:
a boom having juxtaposed thereon at least two boom conveyors;
vertical screw conveyors, each screw conveyor having at a lower end an inlet port for receiving a bulk commodity to be conveyed and mating at an upper end portion within a chute at a head of the boom for discharging the bulk commodity into a corresponding boom conveyor, said vertical screw conveyors each being adapted to be exclusively combined with the corresponding boom conveyor, one of said vertical screw conveyors being disengageably mounted on said head of said boom at a location between said juxtaposed boom conveyors;

means for hanging at least one of said vertical screw conveyors from the head of said boom in such a manner as to allow the swinging of the vertical screw conveyor; and a storing stand for hanging thereon the vertical screw conveyors that are not in use, wherein said head of said boom is capable of movement toward the vertical screw conveyors on said storing stand.

2. An unloader comprising:

a boom having juxtaposed thereon at least two boom conveyors;

vertical screw conveyors, each screw conveyer having at a lower end an inlet port for receiving a bulk commodity to be conveyed and mating at an upper end portion with a chute at a head of the boom for discharging the bulk commodity into a corresponding boom conveyor, said vertical screw conveyors each being adapted to be exclusively combined with the corresponding boom conveyor;

means for hanging all of said vertical screw conveyors from the head of said boom in such a manner as to allow the individual swinging of each of the vertical screw conveyors; and means for causing each of said vertical screw conveyors to swing to a horizontal position and for holding it at said horizontal position;

wherein said chutes have on side surfaces chute ports, each port being formed into a circular-arc shape defined about the center of swinging of a respective vertical screw conveyor, said chutes also having at end portions thereof discharge openings opening above said boom conveyors, each of said vertical screw conveyors, having at an upper portion a discharge port registerable with a respective chute port.

* * * * *